United States Patent Office 3,248,632
Patented Apr. 26, 1966

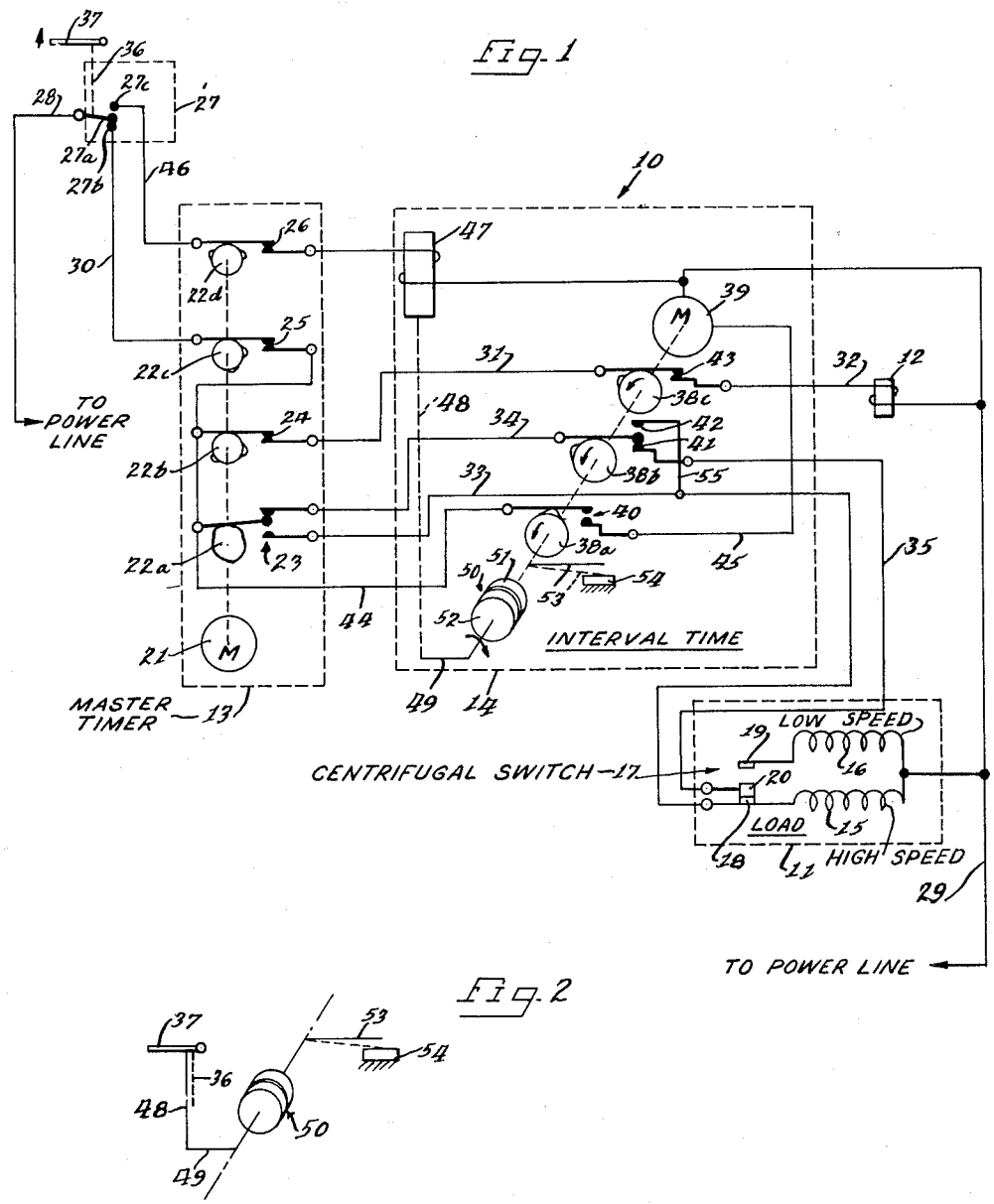

3,248,632
INTERVAL TIMER CONTROL CIRCUIT FOR
A TWO SPEED MOTOR
Joe Bowman, Greentown, Ind., assignor to Kingston
Products Corporation, Kokomo, Ind., a corporation of
Indiana
Original application Apr. 10, 1961, Ser. No. 101,933, now
Patent No. 3,185,867, dated May 25, 1965. Divided
and this application Sept. 16, 1964, Ser. No. 396,966
9 Claims. (Cl. 318—447)

This invention relates generally to time delay means, and more specifically to an improved electrical circuit embodying time delay means.

This application is a division of my copending application, Serial No. 101,933, filed April 10, 1961, now U.S. Patent No. 3,185,867.

Although the principles of the present invention may be included in various devices or circuits, a particularly useful application is made in a time delay circuit for a laundry machine, such as an automatic washing machine of the home laundry type. Typical machines of this type include a two-speed motor which, along with other components, is operated by a master timer in accordance with a predetermined program or cycle. The user of such a device may manually interrupt the cycle at any time to add to or to remove from the number of articles being cleansed, or to inspect the same. Not all points within the program represent a peak load on the machine, and in certain instances if the machine is stopped under a peak load condition, subsequent restarting thereof under such peak load condition could be abortive, or could be damaging to the two-speed motor.

The present invention contemplates the utilization of time delay means which are set into operation automatically to modify the peak load condition temporarily to be a no-load or a low-load condition, after which the regular program cycle is resumed.

Accordingly, it is an object of the present invention to provide improved electrical time delay means.

Another object of the present invention is to provide an improved time delay circuit for protecting a motor.

A still further object of the present invention is to provide time delay means which are automatically responsive to a predetermined condition.

Yet another object of the present invention is to provide time delay means in a circuit for protecting a device against initiation of operation thereof under peak load conditions.

A still further object of the present invention is to protect the two-speed motor of a laundry machine against overload arising out of attempted starting of the same by means of the high-speed winding thereof.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a schematic diagram of a time delay circuit and mechanism provided in accordance with the principles of the present invention; and FIGURE 2 is a schematic fragmentary diagram illustrating a modified form of reset mechanism.

As shown on the drawing:

The principles of this invention are particularly useful when embodied in time delay means such as illustrated in FIGURE 1, generally indicated by the numeral 10. The time delay means 10 includes a circuit having one or more devices 11, 12, the operation of which is normally controlled by a master timer 13, the time delay circuit including an interval timer 14 connected between the master timer 13 and the load devices 11 and 12.

The instant invention is used to advantage in a laundry machine, such as an automatic washing machine, where the device 11 comprises a two-speed motor, and the device 12 comprises a spin control solenoid. The motor 11 is the main drive motor for such washing machine in this illustration, and typically includes two main windings 15, 16. The motor 11 is conventional and has a conventional starting winding and switch associated with the main winding 15, which have been omitted from the drawing since the same are known in the art. By way of example, the winding 15 may be disposed upon four poles, and for purposes of identification, is referred to herein as a high-speed winding. The winding 16 may comprise a larger number of poles, for example six poles, and is referred to herein as a low-speed winding. Thus, each of the windings 15 and 16 comprises a load circuit, only one of which is energized at a time so as to obtain a relatively low or a relatively high speed of motor rotation. Also included in the motor 11 is a centrifugal switch 17 which has a terminal or contact 18 continually connected to the high-speed winding 15, a terminal or contact 19 continually connected to the low-speed winding 16, and a centrifically responsive contact 20 which engages the contact 18 when the motor is stationary, and which is thus normally closed therewith. The contact 20 is engageable with the contact 19 whenever the motor speed reaches a predetermined cutover speed which is below the ultimate speed that the motor would obtain if the motor 11 were continually energized through the high-speed winding 15.

The device 12, represented as a solenoid, is typical of other components which may be deenergized temporarily to minimize peak current values, in accordance with this invention.

The master timer 13 which controls the various devices in the circuit, such as the load devices 11 and 12, is of conventional or known structure. Only so much of the master timer 13 is here illustrated as is necessary for a full understanding of the present invention, and it includes a timer motor 21 drivably connected to cam-means 22a, 22b, 22c, and 22d, the cam-means controlling the position of a number of switches 23, 24, 25, and 26. The cam-means 22a–d have a periphery or contour or configuration required to achieve a desired program of control for the various components controlled thereby, the number and length of rises and falls or highs and lows on such cam-means being a matter of choice to suit a particular use.

In this embodiment, the master timer switches 23–26, are under the further control of a master switch 27, and more specifically, under the control of the contacts 27a and 27b thereof.

A pair of lines 28 and 29 provide power to the circuit 10 for operation thereof. The operation of so much of the circuit as has been explained is as follows. With the master switch 27a, 27b closed as shown, power is transmitted through a leadwire 30, through the timer switch 25 to the timer switches 23 and 24. The timer switch 24 is thus capable of providing power through a pair of leads 31 and 32 to the solenoid 12.

The timer switch 23 under the control of the cam-means 22a, is operative when in its lowest position to provide power through a leadwire 33 to the high-speed winding 15. Thus the lower side of the switch 23, the leadwire 33, and the winding 15 jointly comprise a high-speed circuit, which thus has a portion in the master timer 13 and a portion in the two-speed motor 11. Thus when the switch 23 is in its lower position, the high-speed circuit is energized for obtaining operation of the motor 11 continuously at its higher speed.

Connected in parallel with the high-speed circuit 33 is a low-speed circuit 34, 35, which includes a portion in the master timer 13 which is the upper portion of the switch 23, and a portion in the two-speed motor 11, which is the low-speed winding 16. It is to be noted that when the low-speed circuit 34, 35 is energized, the same communicates initially by means of the centrifugal switch 17 with the high-speed winding 15 which with its aforesaid starting winding serves as a starting winding for the low-speed winding 16 under this condition, the switch 17 cutting over to the low-speed winding 16 before the ultimate high-speed of the winding 15 is obtained.

Assuming that the master timer 13 is in the position such as shown by the solid lines, with power applied to the leadwires 28 and 29, it is apparent that the contacts 19 and 20 of the centrifugal switch 17 will be closed, and that the motor will be driven at its lower speed. Likewise, the solenoid 12 will be energized. If, under this set of conditions, the switch 27a, 27b is opened, it is apparent that all power to the devices 11 and 12 will be interrupted, and when the contacts 27a, 27b are reclosed, an extremely high and abnormal current load will be placed on the lines 28 and 29. In a practical installation, this combination of conditions will occur when the mechanical load on the two-speed motor is relatively high, thereby further aggravating the problem. The problem that thus arises by stopping and restarting the circuit under high load conditions is thus accentuated.

The switch 27 is mechanically connected as at 36 to a laundry machine door 37, movement of which in the direction of the arrow may be referred to as door opening, and movement of which in a direction opposite to the arrow may be referred to as door closing. Thus, the switch contacts 27a, 27b are responsive to door opening and to door closing. Opening of the door 37 might occur during a controlled cycle if the operator wishes to add a garment to the load, to remove a garment from the load, or to inspect the progress or effect of the cycle on the load. Thus, a user may innocently open the door 37 and reclose it at a time when the master timer 13 is in such a position as to call for the controlled devices to be energized while under high load conditions.

In accordance with this invention, I have provided the interval timer 14 which is responsive to a predetermined condition, such as the door position, to temporarily minimize or redistribute the load for a fixed predetermined interval.

The interval timer 14 includes cam-means 38a, 38b, and 38c, collectively referred to as cam-means 38, which may comprise any known structural form. The cam-means 38 are driven by a timer motor 39 in the direction indicated by the arrows on the cams to the position illustrated in the drawing. The interval timer 14 includes a normally open switch 40, a normally closed switch 41, a normally open switch 42, and a normally closed switch 43. The switch 43 is normally closed so that the switch 24 can normally control the device 12. The switch 41 is normally closed so that the upper portion of the switch 23 may normally control the low-speed circuit 34, 35. It is to be noted that the high-speed circuit 33 includes no switch between the lower portion of the switch 23 and the centrifugal switch 17, and thus physically the high-speed circuit 33 may be disposed externally of the interval timer 14.

To energize the interval timer motor 39, power is brought from the master timer switch 25, through a lead 44, through the normally open switch 40, and thence by a lead 45 to the motor 39, the other side of the motor 39 being connected to the leadwire 29. It is thus clear that for the position of the cam-means 38 illustrated, the motor 39 will not be operating.

To shift the cam-means 38 to a position where the switch 40 will be closed, there is provided a further contact 27c in the switch 27 which is engaged by the contact 27a in response to door opening, thereby energizing a leadwire 46 under the control of the master timer switch 26, and leading to an electromagnetic actuator 47 which is also connected to the line 29. The electromagnetic actuator 47 is mechanically connected as at 48 to movable means 49. A clutch 50 has a side 51 connected to the cam-means 38, and another or opposite side 52 connected to the movable means 49. Upon movement of the door 37 in an opening direction, the contacts 27a, 27c are closed, thereby energizing the electromagnetic actuator 47 which mechanically acts on the movable means 49 to rotate the side 52 of the clutch 50 in the direction of the arrow, which direction is opposite to that in which the interval timer motor 39 drives the cam-means 38. The clutch 50 transmits this movement to the cam-means 38 so as to simultaneously close the switches 40 and 42, and so as to simultaneously open the switches 41 and 43. When so shifted, the cam-means 38 are then disposed in a start position which represents the start of the program or cycle controlled by the interval timer 14.

If desired, means may be provided to accurately define this start position. To that end, I have illustrated means at 53 which are jointly movable with the cam-means 38 and which are engageable with a stop 54 when they have moved to the position indicated in broken lines, whereby a fixed starting position for the cam-means 38 and the switches 40-43 is defined.

Upon reclosing of the door 37, power will be brought to the master timer switch contacts 25, but the device 12 cannot be energized since the contacts 43 are open. Power will also be brought through the switch 23 in the master timer 13, it being in the upper position, to energize the leadwire 34, the same being a part of the low-speed circuit. However, the switch 41 is then open to preclude any application of power through the lead 35 to the contact 20 in the centrifugal switch 17, but power is directed through the then closed switch 42 which has a connection 55 with the high-speed circuit 33 to deliver power only to the high-speed winding 15, the centrifugal switch 17 being by-passed. Thus, where there is a high mechanical load on the two-speed motor 11, other loads are de-energized, and the centrifugal switch 17 is by-passed so that the high-speed winding will remain energized even though the cutover speed of the centrifugal switch has been reached or exceeded. This condition may continue advantageously for any desired period of time after the cutover speed is normally reached, for example until the ultimate speed obtainable by the high-speed winding 15 is reached.

Closing of the switch contacts 27a, 27b also effects delivery of power through the leadwire 44, the now closed switch 40, and the leadwire 45, to the interval timer motor 39, thereby causing the cam-means to be driven to the point where the cam-means 38a re-opens the switch 40, such point being herein referred to as the stop or finish position, as illustrated.

The specific configuration of the cam-means 38 illustrated herein, is understood to be entirely exemplary, it being understood that the effective portion of the cam-means 38b and 38c is that which engages the switch blades of the associated switches from the start to the finish position. At any event, an appropriate predetermined timing cycle is provided on the cam-means 38 to insure obtaining of the required delay. By way of example, the timer motor 39 may drive the cam-means, once it is energized at its start position, for nineteen seconds at which time the switch 42 would reopen and the switch 41 reclose, the switch 43 closing a second or two later, and the switch 40 opening a second or so after all other switches in the interval timer have reached their finish position.

The switch contact 27c, the switch 26, the electromagnetic actuator 47, the mechanical connection 48, and the movable means 49, or certain portions thereof, are jointly referred to herein as a reset mechanism. It is clear that the reset mechanism responds to each occurrence of a predetermined condition which, in this instance, is the opening of the door 37. Every time that the door 37 opens with the switch 26 closed, the reset mechanism moves the interval timer to a start position, and it does so even if the door 37 was opened at any point in the running of the cycle of the interval timer 14. Each such reopening insures that the full delay built into the interval timer 14 will occur.

This structure is particularly advantageous under a further condition. If the switch 26 is closed and the switch 23 is closed in a downward direction so that power is being provided to the high-speed circuit, and then the door 37 is opened, resetting of the interval timer 14 will occur, even though there is no immediate need for a time delay. However, if, for example, a moment after the door 37 has been reclosed, the switch 23 should move to the position shown in solid lines, the remaining portion of the delay cycle will nevertheless be provided so as not to overload the motor 11. Thus, the reset mechanism responds to each occurrence of the predetermined condition, namely the opening of the door, and the reset mechanism is always operative when actuated to drive the cam-means 38 in a direction opposite to that of the motor 39 by an amount which brings the engageable means 53 against the stop, any excess travel in the electromagnetic actuator 47 being provided for by the clutch 50. In summary, the opening of the door 37 is the predetermined condition which effects a resetting of the interval timer 14, while the closing of the door 37 is the predetermined condition which initiates operation of the timing cycle of the interval or delay timer 14.

In certain instances, the mechanical connection 48 may be connected directly to the door 37, thereby enabling the omission of contact 27c in switch 27, line 46, cam-means 22d, switch 26, and the electromagnetic actuator 47. Such a modification is illustrated in FIGURE 2 where the mechanical connection 48 is shown in solid lines. The door 37 will, of course, have the further mechanical connection 36 leading to the switch 27, as shown in FIGURE 1.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A circuit comprising in combination: a two-speed motor having a low-speed continuous duty winding and a high-speed continuous duty winding; and an interval timer connected to said two-speed motor in such manner and having such means as to always complete the circuit only through said high-speed winding for a predetermined limited period of time, and thereafter operative to prepare completion of the circuit only through said low-speed winding.

2. A circuit comprising in combination: a two-speed motor having a low-speed continuous duty winding, a high-speed continuous duty winding, and a centrifugal switch connected thereto, said switch normally completing the circuit through said high-speed winding from a stopped position to a cut-over speed below the ultimate high speed, and normally through said low-speed winding at speeds above the cut-over speed; and an interval timer connected to said two-speed motor in such manner and having such means as, when actuated, to break the circuit through said centrifugal switch, and to always complete the circuit through said high-speed winding until said motor has reached a speed above said cut-over speed, and thereafter operative to prepare completion of the circuit through said low-speed winding.

3. A circuit comprising in combination: a two-speed motor having a low-speed continuous duty winding, a high-speed continuous duty winding, and a centrifugal switch connected thereto, said switch normally completing the circuit through said high-speed winding from a stopped position to a cut-over speed below the ultimate high speed, and normally through said low-speed winding at speeds above the cut-over speed; and an interval timer connected to said two-speed motor in such manner and having such means as, when actuated, to break the circuit through said centrifugal switch, and to always complete the circuit through said high-speed winding until said motor has reached a speed above said cut-over speed, and thereafter operative to prepare completion of the circuit through said centrifugal switch and said low-speed winding.

4. A circuit comprising: a device having two alternatively energizable continuous duty load circuits; a master timer normally controlling current for both of said load circuits and operative to energize only one of them at a time; and an interval timer connected between said master timer and said load circuits, and operative, when said master timer is calling for the energizing of only one of said load circuits, to effect always, in response to each occurrence of a further predetermined condition, energization of only the other of said load circuits for a predetermined interval, and thereafter operative to prepare completion of the circuit only through said one of said circuits by restoring the control of said load circuits to said master timer.

5. A circuit for a laundry machine having a door, said circuit comprising in combination: a motor having a low-speed continuous duty circuit and a high-speed continuous duty circuit; a master timer connected to be normally controlling current for both of said motor circuits and operative to energize only one of them at a time; and an interval timer connected in the laundry machine circuit between said master timer and said motor circuits, and operative, when said master timer is calling for energizing only said low-speed motor circuit, always to effect, in response to each opening and closing of the machine door, energization of only said high-speed motor circuit for a predetermined interval, and thereafter operative to prepare completion of the circuit only through said low speed winding, thereby restoring the control of said motor circuits to said master timer.

6. A circuit for a laundry machine having a door, said circuit comprising in combination: a motor having a low-speed circuit and a high-speed circuit; a master timer connected to be normally controlling current for both of said motor circuits and operative to energize only one of them at a time; a master switch adapted to be opened in response to opening of the machine door and to interrupt current flow to said motor circuits in response to such door opening; and an interval timer connected in the laundry machine circuit between said master timer and said motor circuits, and operative, when said master timer is calling for energizing only said low-speed motor circuit, to effect, in response to such door opening, a connection with only said high-speed motor circuit; said interval timer being operative in response to closing of the machine door and said master switch to energize said high-speed motor circuit for a predetermined interval, and thereafter operative to restore the control of said motor circuits to said master timer.

7. A circuit for a laundry machine having a door, said circuit comprising in combination: a two-speed motor; a master timer; a low-speed circuit having portions in said master timer and motor; a high-speed circuit having portions in said master timer and motor, and connected in parallel with said low-speed circuit; said low-speed and high-speed circuits normally being controlled by said master timer, and only one of said low and high-speed circuits being energizeable thereby at one time; and an interval timer having normally closed switch means connected in said low-speed circuit, said interval timer having means rendering it responsive to a predetermined position of the door; said interval timer being operative, when said means is actuated by door movement, to open said switch means and to interconnect the master timer portion of the low-speed circuit with the motor portion of the high-speed circuit for a predetermined interval, and to thereafter restore the control of said low-speed circuit to said master timer.

8. A circuit for a laundry machine having a door, said circuit comprising in combination: a motor having a low-speed circuit and a high-speed circuit, said low-speed circuit being energizable by means of a centrifugal switch driven by said motor, and being so energized only above a predetermined motor speed, a master timer connected through said centrifugal switch to be normally controlling current for both of said motor circuits; a master switch adapted to be opened in response to opening of the machine door and to interrupt current flow to said motor circuits in response to such door opening; and an interval timer having cam-operated switches connected in the laundry machine circuit between said master timer and said motor circuits, and having a reset mechanism operative on said cam-operated switches in response to said opening of the machine door, when said master timer is calling for energizing only said low-speed motor circuit, to effect, in response to such door opening, a connection with only said high-speed motor circuit; said interval timer being operative in response to closing of the machine door and said master switch to energize said high-speed motor circuit for a predetermined interval, and thereafter operative to restore the control of said motor circuits to said master timer.

9. A circuit for a laundry machine having a door, said circuit comprising in combination: a two-speed motor; a double throw centrifugal switch; a master timer; a low-speed circuit having portions in said master timer, centrifugal switch and motor; a high-speed circuit having portions in said master timer, centrifugal switch and motor, and connected in parallel with said low-speed circuit; said low-speed and high-speed circuits normally being controlled by said master timer; and an interval timer having normally closed cam-operated switch means connected in said low-speed circuit, said interval timer having reset means responsive to a predetermined position of the door; said interval timer being operative, when said reset means is actuated by door movement, to open said cam-operated switch means and to interconnect the master timer portion of the low-speed circuit directly with the motor portion of the high-speed circuit for a predetermined interval determined by said interval timer, and to thereafter restore the control of said low-speed circuit through said centrifugal switch to said master timer.

References Cited by the Examiner

UNITED STATES PATENTS

| | | | |
|---|---|---|---|
| 2,488,658 | 11/1949 | Brennan | 318—225 X |
| 2,502,823 | 4/1950 | Clark | 318—486 X |
| 2,697,193 | 12/1954 | Jones | 318—401 X |
| 2,848,630 | 8/1958 | McNicol et al. | 318—486 X |
| 3,044,000 | 7/1962 | Bahra | 318—486 X |
| 3,148,321 | 9/1964 | Holzer | 318—486 |

ORIS L. RADER, *Primary Examiner.*